United States Patent
Ben-Dor et al.

(10) Patent No.: US 10,404,662 B1
(45) Date of Patent: Sep. 3, 2019

(54) VICE SYSTEM, METHOD, AND MEDIUM FOR PROTECTING A COMPUTER BROWSER FROM THIRD-PARTY COMPUTER CODE INTERFERENCE

(71) Applicant: Source Defense, St. Beer-Sheva (IL)

(72) Inventors: Gilad Ben-Dor, Petah Tiqwa (IL); Ehud Machluf, Merkaz Shapira (IL); Eido Gavish, Yavne (IL); Hadar Blutrich, Kfar Yona (IL)

(73) Assignee: Source Defense, St Beersheva (IL)

( * ) Notice: Subject to any disclaimer, the term of this patent is extended or adjusted under 35 U.S.C. 154(b) by 116 days.

(21) Appl. No.: 15/865,824

(22) Filed: Jan. 9, 2018

Related U.S. Application Data

(63) Continuation-in-part of application No. 15/347,765, filed on Nov. 9, 2016.

(60) Provisional application No. 62/443,902, filed on Jan. 9, 2017, provisional application No. 62/253,669, filed on Nov. 10, 2015.

(51) Int. Cl.
  *H04L 29/06* (2006.01)
  *G06F 8/30* (2018.01)
  *H04L 29/08* (2006.01)

(52) U.S. Cl.
  CPC .......... *H04L 63/0236* (2013.01); *G06F 8/315* (2013.01); *H04L 67/025* (2013.01); *H04L 67/20* (2013.01)

(58) Field of Classification Search
  CPC ................ G06F 21/54; G06F 9/44526; G06F 2221/033; H04L 63/308
  See application file for complete search history.

(56) References Cited

U.S. PATENT DOCUMENTS 6,301,661 B1 * 10/2001 Shambroom .......... G06F 21/33
                                                      713/168
6,546,554 B1 * 4/2003 Schmidt .............. G06F 9/44526
                                                      709/201

(Continued)

OTHER PUBLICATIONS

The application is a CIP of U.S. Appl. No. 15/347,765, filed Nov. 9, 2016, non-published.

*Primary Examiner* — Harunur Rashid
(74) *Attorney, Agent, or Firm* — Carrie M Stroup

(57) ABSTRACT

Computer system, methods, and non-transitory storage medium for protecting a client device that is browsing a website from undesired actions of third-party software. Virtual iFrame Containment Enclosure (VICE) code (e.g. JavaScript/WebAssembly) is tailored per website that defines a set of policies of what each third-party code can and cannot do. The server also tracks and analyzes data reports from the websites, and provides reports and alerts to website administrators. Therefore, a browser on a client device visiting the website, and thus executing the VICE code that is tailored for that specific website, is protected from the third-party code, without hindering the proper action of the third-party software and without the third-party knowing that their code was monitored and controlled. Third-party activity can be monitored by the system via the combination of functionality for or more of the following: Enclosure iFrame; Reflection; DOM functionality overriding; Instrumentation; Policy-Center; Evasion; and CORS-Proxy.

16 Claims, 10 Drawing Sheets

(56) References Cited

U.S. PATENT DOCUMENTS

2010/0257610 A1* 10/2010 Hohl .................. G06F 21/51
                                                  726/25
2014/0189864 A1*  7/2014 Wang ................. G06F 21/51
                                                  726/23

* cited by examiner

VICE SYSTEM, METHOD, AND MEDIUM FOR PROTECTING A COMPUTER BROWSER FROM THIRD-PARTY COMPUTER CODE INTERFERENCE

CROSS-REFERENCE TO RELATED APPLICATIONS

And this application claims the benefit of U.S. Provisional Patent Application Ser. No. 62/443,902 filed Jan. 9, 2017. This application is a continuation-in-part to U.S. patent application Ser. No. 15/347,765 filed Nov. 9, 2016, which claims the benefit of U.S. Provisional Patent Application Ser. No. 62/253,669 filed Nov. 10, 2015. The entire disclosures of each of those applications are hereby incorporated by reference, as if set forth fully herein.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

TRADEMARKS NOTICE

The trademarks, website names, programming language names, etc. that are used in the present disclosure are the property of the respective owner companies and are used herein for illustrative purposes only.

FIELD OF THE DISCLOSURE

The present disclosure relates generally to computer systems, methods, and non-transitory computer storage medium to assist a website in protecting against unwanted or malicious activity resulting from the execution of third-party computer code.

BACKGROUND OF THE DISCLOSURE

Many websites include content from third parties—usually via tags (e.g. <script src="http://thirdparty/ . . . ">). These third parties may provide services to the website, such as ad-serving, analytics, social media, user support, and many other desirable functionalities. Some third parties also include other third parties—most notably ad-servers, which often serve rich experiences that are created by creative-agencies, or defer the serving to other ad-networks. Because of how HTML and JavaScript work, all included third parties in a website can operate completely unrestricted—meaning they have full access to all resources of the website—just as the website's original code has. (The exception is cross-domain <iframe> tags, which are so limiting that they cannot be used in many situations.)

Websites are sometimes hurt by the third-party because of this lack of restrictions. For example, a third-party's server could be breached, and malicious code could deform the website, or steal users' data (mainly on sites with log-in). And/or a third-party may replace a website's paid ads with its own ads. And/or a third-party can harvest information on the users, to be stored on cookies and allow better targeting of ads on other websites (a.k.a. "behavioral targeting"). Websites want to get paid to allow such harvesting, but any third-party—even one which is in-directly included—can do that without paying the website.

Therefore, there is a great need for a computerized system that allows websites to execute third-party computer code under restricted permissions to prevent undesired third-party activity that adversely affects the client user device. In particular, there is a need within the industry for a computer system, method(s), and non-transitory computer readable storage medium to assist a user, such as a website administrator, in defining and enforcing limitations on third-party activity in real-time. Many types of third-party activity that may be undesirable by the site's administrator should be mediated by the system via the combination of functionality, for example (to be explained herein): Enclosure iFrame; Reflection; DOM functionality overriding; Instrumentation; Policy-Center; Evasion; and CORS-Proxy.

SUMMARY OF THE DISCLOSURE

The various embodiments of the present disclosure comprise computerized systems, methods, and non-transitory computer readable storage medium for allowing a website that instructs the browser of a computer to include third-party code (e.g. Java-Script, WebAssembly, HTML, CSS), to limit the access of the third-party code to resources on the browser—with minimal interference of the third-party's algorithm (the principle of "Evasion"). This will block the third-party algorithm from engaging in unwanted behavior on a user's electronic computing device without the third-party's knowledge of this blocking or evasive activity.

In the various embodiments, many types of third-party activity that may be undesirable by the site's administrator should be mediated by the system via the combination of functionality, for example (to be explained herein): Enclosure iFrame; Reflection; DOM functionality overriding; Instrumentation; Policy-Center; Evasion; and CORS-Proxy.

iFrame—Technical Background:

An iFrame is a kind of a virtual page within the main page. It has its own resources and behaves independently from the main page. Some iFrames are "same domain" and some are "cross domain". Same-domain iFrames can freely access resources in the main page, and the main page can freely access resources in them. Cross-domain iFrames cannot access the main page at all, and the main page can't access them at all. The only communication allowed between the page and its cross-domain iFrame is via "messages". These messages can only contain basic pieces of data (e.g. numbers, strings, arrays, simple-objects, and some other basic types). For example, a message can't contain functions, nor DOM elements—which are more complex resources, that internally reference other resources in the page.

Enclosure:

In the context of VICE, an "Enclosure" is basically a cross-domain iFrame with special constructs attached. An enclosure iFrame is opened by VICE and is always kept in-visible (positioned outside the visible portion of the page). When initialized, the iFrame is set to have a message-handling module that can communicate with the VICE software in the main page. This messaging module is known as the "Tunnel". VICE makes it so that the third-party code is executed within the Enclosure (e.g. within the iFrame). VICE, via the Tunnel, makes sure that all the resources in the main page that are needed for the healthy behavior of the third-party are reflected into the enclosure, and also, that all the resources that the third-party creates or changes (for example, an advertisement image) are reflected back into the main page.

Reflection:

As described above, resources that are created or updated in both the main page and the Enclosure are reflected back and forth via the Tunnel. These resources include DOM elements and DOM Events (either user-events, such as mouse-move, mouse-click, keyboard-click, scroll, etc. or auto-generated events, such as "image has loaded" etc.).

Overriding of Native DOM Functionality:

In the iFrame, VICE will override some native DOM functionality, by assigning over native methods, replacing native properties' setters/getters, etc. For example, the native method "document.write" should be overridden to allow VICE to have a chance to alter parts of the written HTML, to support the policies defined by the site's administrator. While implementing such overriding in the main page is prone to adversely affect the whole site, doing so only inside the Enclosure would have no such potential.

Authority:

An Authority is a third-party that "lives" inside a Reflection. There may be more than one Authority per Enclosure. The site-administrator can define a different set of policies (to be defined herein) per Authority. VICE keeps track of the resources (such as DOM elements) that are created by each Authority, and codes (Java-Script, HTML, WebAssembly, etc.) that are created by each Authority. Whenever some code is executing in the Enclosure, VICE knows the authority that is (directly or in-directly) responsible for it. At the simplest level, an Authority is a third-party that the site-administrator wishes to use. For example, an ad-network third-party such as DoubleClick™, Outbrain™, Taboola™, etc. This third-party may invite "fourth-parties" into the page (actually, into the Enclosure): code from other business entities that actually shows the ads. This could theoretically cascade even further—to "fifth-parties" or even "sixth-parties", etc. Whenever a code of some authority makes a JavaScript request (e.g. <script src=" . . . ">), the policies that are determined by the site's administrator can decide to assign a different authority to the included JavaScript.

Policy-Center:

The present disclosure further comprises a Policy-Center for determining how to handle different types of third-party activity. A policy-decision is usually comprising: Deny, Grant, or Alter.

The present disclosure also has the advantage of storing "Policies" and permissions for third-party code for each website with an account on the VICE server. The VICE Java-Script/WebAssembly code itself resides in individual website device files, or records, on the VICE remote server, and is processed by the server algorithm according to the website visitor device's browser type and effective policies, and before being sent to the website visitor device's browser.

The Principle of "Evasion":

Whatever the policy-center decides, VICE will enforce the policy while taking special care that the third-party algorithm is not broken. When the policy decides to Deny or Alter an action of the user-code, VICE will try to make it so that the user-code can continue to work properly. This would allow VICE to execute all third-parties without needing to adjust them at all.

Instrumentation:

The user-code contains executable JavaScript/WebAssembly code that can be fetched via <script src=" . . . ">, or generated dynamically via eval(" . . . ") or element.setAttribute("onclick", " . . . ") or new Function(" . . . "), and many more techniques. According to the Policy, to allow for better handling of the third-party, VICE may alter the third-party code, and execute the altered-code instead of the original user-code. This process is called "Instrumentation", and the altered code is called "Instrumented-code". This allows VICE to control operations that can't usually be controlled, like assignment into "window.location" and getting a reference to the main-page using "window.parent".

CORS:

Due to restrictions posed by W3C (namely "CORS"=Cross-Origin-Resource-Sharing), a third-party JavaScript code can always be executed via <script src=" . . . ">, but the actual code can only be accessed as a text if the third-party web-server allows for it—by sending the "Access-Control-Allow-Origin" HTTP header. So, when a third-party does not allow this, the Policy center can either allow it to execute un-instrumented, or to block it altogether, or alter it to go through the CORS-Proxy as described herein.

CORS-Proxy:

When a third-party's doesn't provide the "Access-Control-Allow-Origin" HTTP header for an HTTP request that returns JavaScript code, the Policy may instruct VICE to alter the URL so that the HTTP request goes to a dedicated "CORS-Proxy" web-server, which internally fetches the Java-Script code using the original URL (note that the CORS limitation is only enforced by browsers: the CORS-Proxy doesn't care if the original server returns the "Access-Control-Allow-Origin" HTTP header or not). Then, the CORS-Proxy returns the JavaScript code back to the browser—with no changes other than adding the "Access-Control-Allow-Origin" HTTP header: now the browser allows VICE to access the JavaScript as text.

Cookies Blocking or Localization:

By way of exemplification: a behavioral-tracking third-party whose DNS is "www.behave.com" is present in many web-sites. Whatever the user is doing in all of these sites is causing the user's browser to send a HTTP requests to "www.behave.com" with the same set of cookies. Thus, if the user viewed second-hand cars on one site, the user will suddenly be swamped by car ads. The clients of VICE are web sites. These sites are sometimes in favor of this, but they would like the behavioral-tracking third-party to pay them for the right to track users' behavior. VICE provides the site's administrator the tools to block these cookies, and to only allow them if the third-party pays the site. CORS-Proxy also allows for the "localization" of cookies: the cookies are allowed, but are not kept under "www.behave.com"—but rather under "www.behave.com.vice-proxy.com" so the cookies works fine within this site—but are not available in any other site.

Reports:

Another advantage of the present disclosure is the ability of the VICE remote server to monitor specific actions of the third-party code, which can be recorded for alerts to the website's administrator, and for later analysis and reporting. Among others, the site's administrator wanst to receive reports and alerts about suspicious actions that a third-party performs, the HTTP requests it makes, and other "fourth-parties" that it activates.

The various embodiments of the present disclosure further comprise non-transitory computer readable storage medium and/or a module accessible on an electronic computing device comprising the medium, that comprises instructions, the instructions being operable to enable the device to perform a procedure for protecting a computer visiting a website from a third-party malicious software that is executed within the website without the website's knowledge or permission.

In an embodiment, the present disclosure is an electronic computing device or a remote server comprising: a non-transitory computer-readable storage medium, that stores instructions which, when executed by a processor, direct the processor to perform the computer method(s) disclosed herein.

Likewise, in an embodiment, the present disclosure is an article of manufacture and/or an apparatus (e.g. remote system server, user-visitor and/or website administrator electronic computing device) having one or more non-transitory computer readable storage medium storing instructions thereon which, when executed by a system, cause the system to perform the computer method(s) disclosed herein, such as when the apparatus is a VICE remote-cloud based server: generate a tailored VICE JavaScript/WebAssembly code per site, handle reports from the sites, and provide reports and alerts to site administrators.

BRIEF DESCRIPTION OF THE DRAWINGS

The above and other features, aspects, and advantages of the present disclosure will become better understood with regard to the following description, appended claims, and accompanying drawings where:

DETAILED DESCRIPTION OF EXAMPLE EMBODIMENTS

Glossary of Terms

Figure 1:
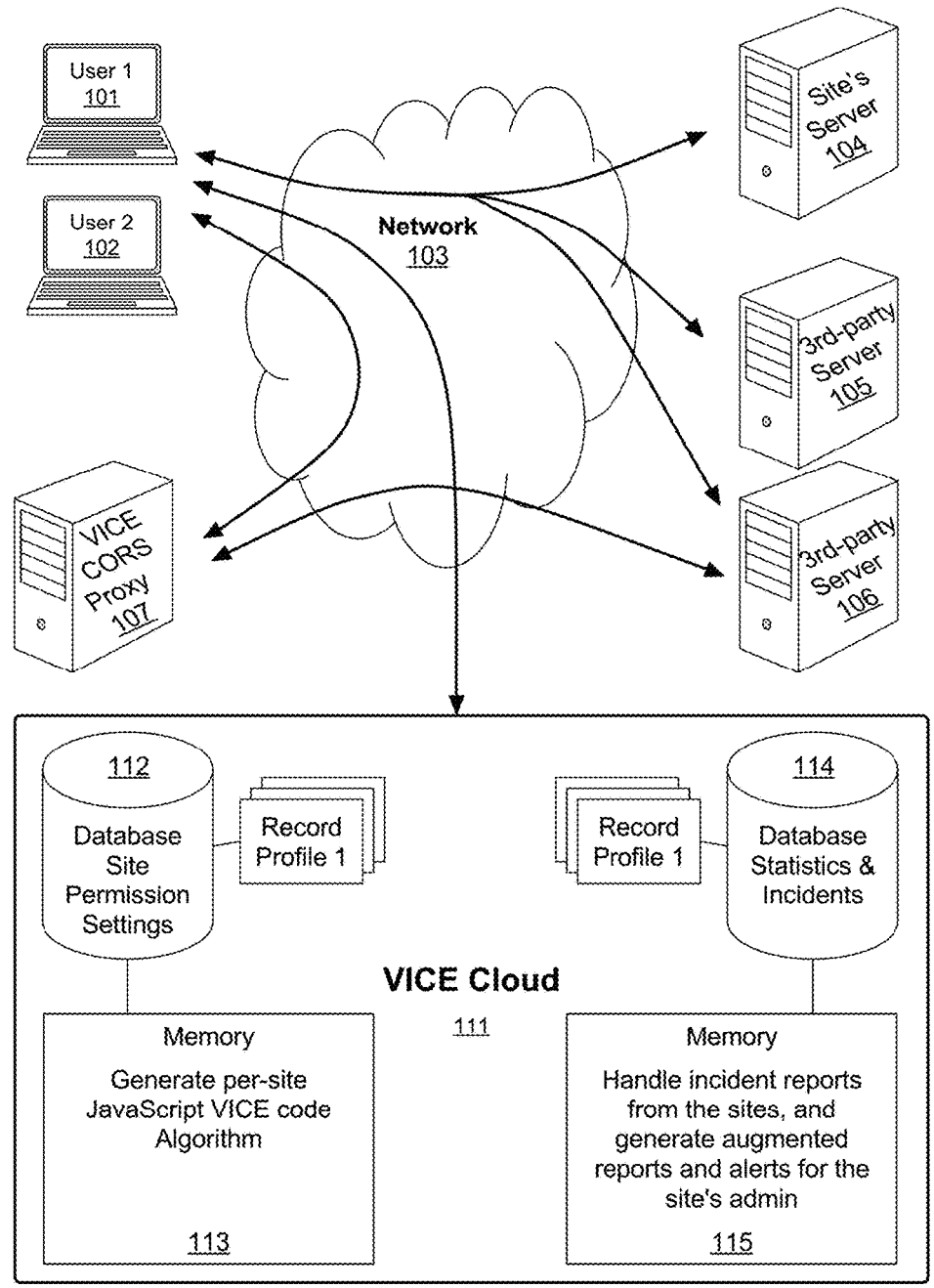
FIG. 1 is a schematic diagram of an exemplary embodiment of the system architecture comprising one or more end-user electronic computing devices communicating with a VICE remote system server.

As used herein, the term "VICE" refers to the present disclosure's computer code within the non-transitory computer readable storage medium, which is also called Virtual iFrame Containment Enclosure.

As used herein, the term "Electronic Computing Device" refers to any electronic communications or computing device comprising a central processing unit (i.e. processor) with the Internet connectivity and a graphical display or screen, such as: laptops, desktops, tablets, iPads, smart-phones, personal digital assistant devices, and the like, that enable the user to input user identifying information, and order and view a user profile.

As used herein, the term "Software" refers to computer program instructions adapted for execution by a hardware element, such as a processor or CPU, wherein the instruction comprises commands that when executed cause the processor to perform a corresponding set of commands. The software may be written or coded using a programming language, such as JavaScript or WebAssembly, and stored using any type of non-transitory computer readable storage medium or machine-readable storage medium well known in the art. Examples of software in the present invention comprise any software components, programs, applications, computer programs, application programs, system programs, machine programs, and operating system software that is VICE code compatible. Although the VICE code mainly executes third-party JavaScript®, it also effectively works with and on (i.e. third-party code) a wide variety of other computer code, such as by way of non-limiting examples WebAssembly, HTML, CSS, and in principle any syntax that is supported by browsers.

As used herein, the term "Application Program Interface (API)" refers to a set of computer programming instructions, for accessing a web based software application or web tool. In the present invention, the API is computer software that is stored in the system server computer memory. The API functions to enable the module to access the system to and order the system to conduct VICE functions.

As used herein, the term "Module" and "Algorithm" refer to a portion of a computer program or software that carries out a specific function and may be used alone or combined with other modules of the same program. The module, algorithm may comprise a native application, a web application, or a widget type application to carry out the methods of detecting and electronically transmitting untranslated character strings. In a one embodiment, a native application is installed on the administrator's and users' device, wherein it is downloaded automatically from the Internet. It may be written in a language to run on a variety of different types of devices; or it may be written in a device-specific computer programming language for a specific type of device. In another embodiment, a web application resides on the system server and is accessed via the Internet. It performs basically all the same tasks as a native application, usually by downloading part of the application to the device for local processing each time it is used. The web application software is written as Web pages in HTML and CSS or other language serving the same purpose, with the interactive parts in JavaScript or other compatible language. Or the application can comprise a widget as a packaged/downloadable/installable web application; making it more like a traditional application than a web application; but like a web application it uses HTML/CSS/JavaScript and access to the Internet.

As used herein, the term "System" may be used to claim all aspects of the present invention wherein it refers to the entire configuration of hardware and software in all embodiments; and a "Computer System" may refer to a system having one or more computers, where each computer may include a non-transitory computer readable storage medium storing software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

As used herein, the term "Computer-Readable Storage Media or Medium" refers to a non-transitory medium that participates in providing data (for example, instructions) which may be read by a computer, a processor or a like device.

As used herein, the terms "Generating", "Processing," "Computing," "Calculating," "Determining," "Establishing", "Analyzing", or the like, may refer to operation(s) and/or process(es) of a computer, a computing platform, a computing system, a computer central processing unit (CPU), or other electronic computing device, that manipulate and/or transform content data represented as physical (e.g., electronic) quantities within the computer's registers and/or memories into other data similarly represented as physical quantities within the computer's registers and/or memories or other information storage media that may store instructions to perform operations and/or processes.

Various embodiments of the presently disclosed subject matter may include or be embodied in the form of computer-implemented methods or processes and apparatuses or electronic computing devices for practicing those methods or processes; and, in the form of a computer program product having computer program code containing instructions embodied in non-transitory and/or tangible medium or media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter.

The various embodiments of the present disclosure may also be in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

And, the various embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

System Architecture

FIG. 1 is a schematic diagram of an exemplary embodiment the system architecture comprising one or more user (client) electronic computing devices 101, 102 visiting via a network 103 a website hosted by a website administrator server 104, wherein it is understood that the system comprises a one or more (e.g. a plurality) of website administrator servers or computing devices 104. Third-party servers 105, 106 send computer code that may perform some undesired actions on the browser on devices 101, 102 by attempting to insert unwanted and/or malicious computer code. The VICE remote (e.g. cloud) system server 111 and the VICE proxy computer 107 prevent this by generating a tailored VICE Java-Script/WebAssembly code per website, such as the website hosted by server 104.

In an embodiment, when the browser on device 101, 102 visits server 104 website, then device 101, 102 browser will automatically load the VICE computer code that was customized for device's 104 website. The VICE code on device 101, 102 browser will then load the third-party code from the third-party servers 105, 106, and execute it while monitoring and preventing unwanted activity without the third-party's knowledge (i.e. the principle of "Evasion").

The VICE server 111 also comprises a computer memory 115 to record and analyze incidents, and a database 114 to store incident reports and statistical computation reports about the incidents. A record, or computer file, is kept for each website's reports (e.g. occurring on the visitor's device 101, 102, due to the third-party code). Data derived from the reports and the statistical analysis of third-party incidents are used when electronically transmitting messages to website administrators of device 104.

The VICE server 111 also comprises computer memory 113 to generate VICE code tailored for a particular website hosted by server 104, for each of a plurality of website servers, and a database comprising a record, or computer file, for each website's permission settings (e.g. "policy"). The VICE code itself resides in server 111, and is processed by a server 111-side algorithm according to the user devices 101, 102 browser type and effective policies for website 104, before being sent to the browsers on device 101, 102.

The VICE computer program code, modules, and algorithms comprising instructions for monitoring third-party code is executed entirely on the website visitor's electronic computing device 101, 102.

The network 103 connects the visitor devices 101, 102 to the website server 104, and to the third-party servers 105, 106, and to the VICE server 111, and to the CORS-Proxy server 107. Network 103 may comprise any type of network well known to the skilled artisan in computer networking, and by way of non-limiting examples include: a local area network (LAN) or a wide area network (WAN), or the connection may be made to an external computer (for example, through the Internet using an Internet Service Provider), and using wired, wireless, and terrestrial or satellite links.

Sample Web-Site Structure

Figure 2:
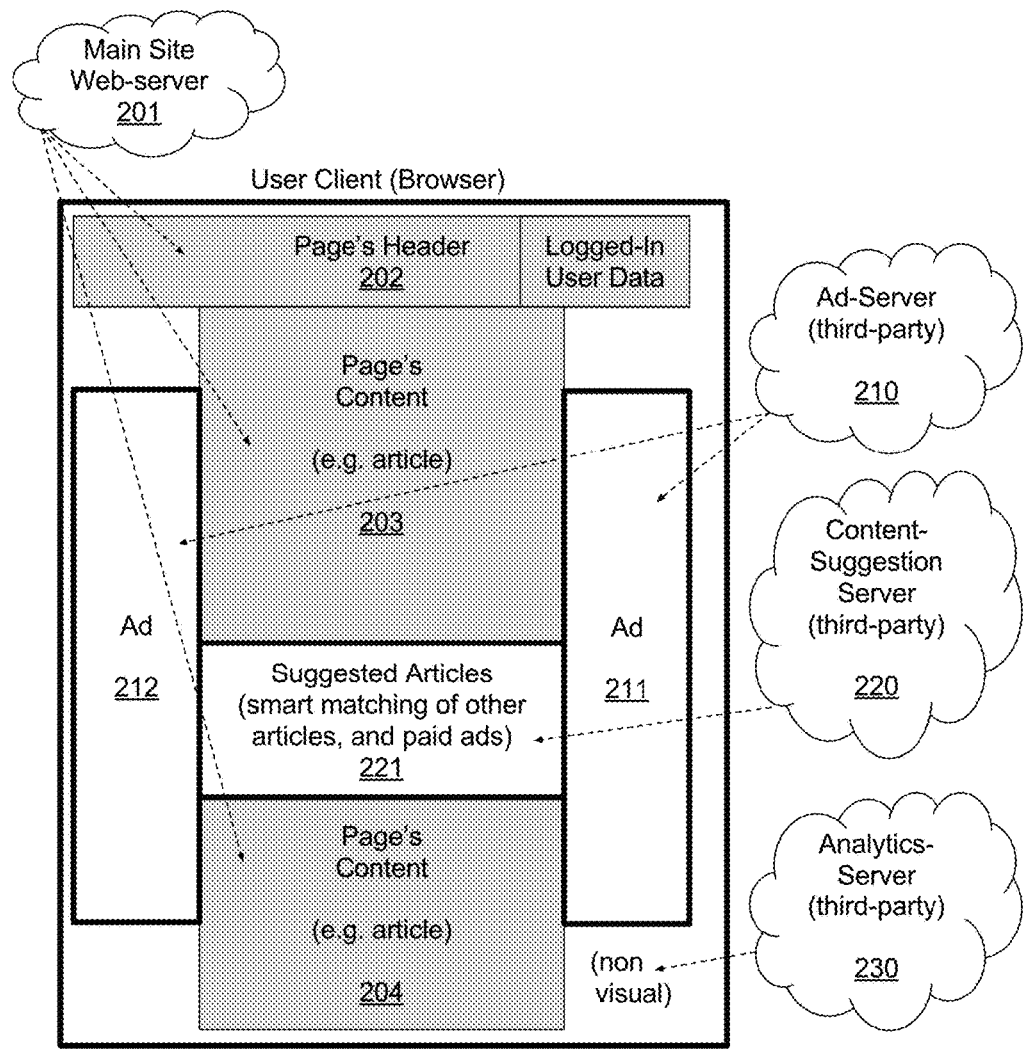
FIG. 2 is a schematic diagram of a standard (yet simplified) web site (not using VICE), showing how the site is inviting third-parties to manage some visual assets in the page, and also a third-party that is invited but has no visual impact on the page.

FIG. 2 is a schematic diagram of a standard (yet simplified) web site (not using VICE), showing how the site is served from the site's web-server 201, which visualizes the site's own regions 202, 203, 204 (marked in gray).

The site further instructs the browser to fetch content from an ad-server 210 (which visualizes two regions in the page 211,212).

The site further instructs the browser to fetch content from a content-suggestion server 220 (which visualizes one region in the page 221).

The site further instructs the browser to fetch content from an analytics-server 230 (which has no visualize effect in the page).

Sample Site Enclosures

Figure 3:
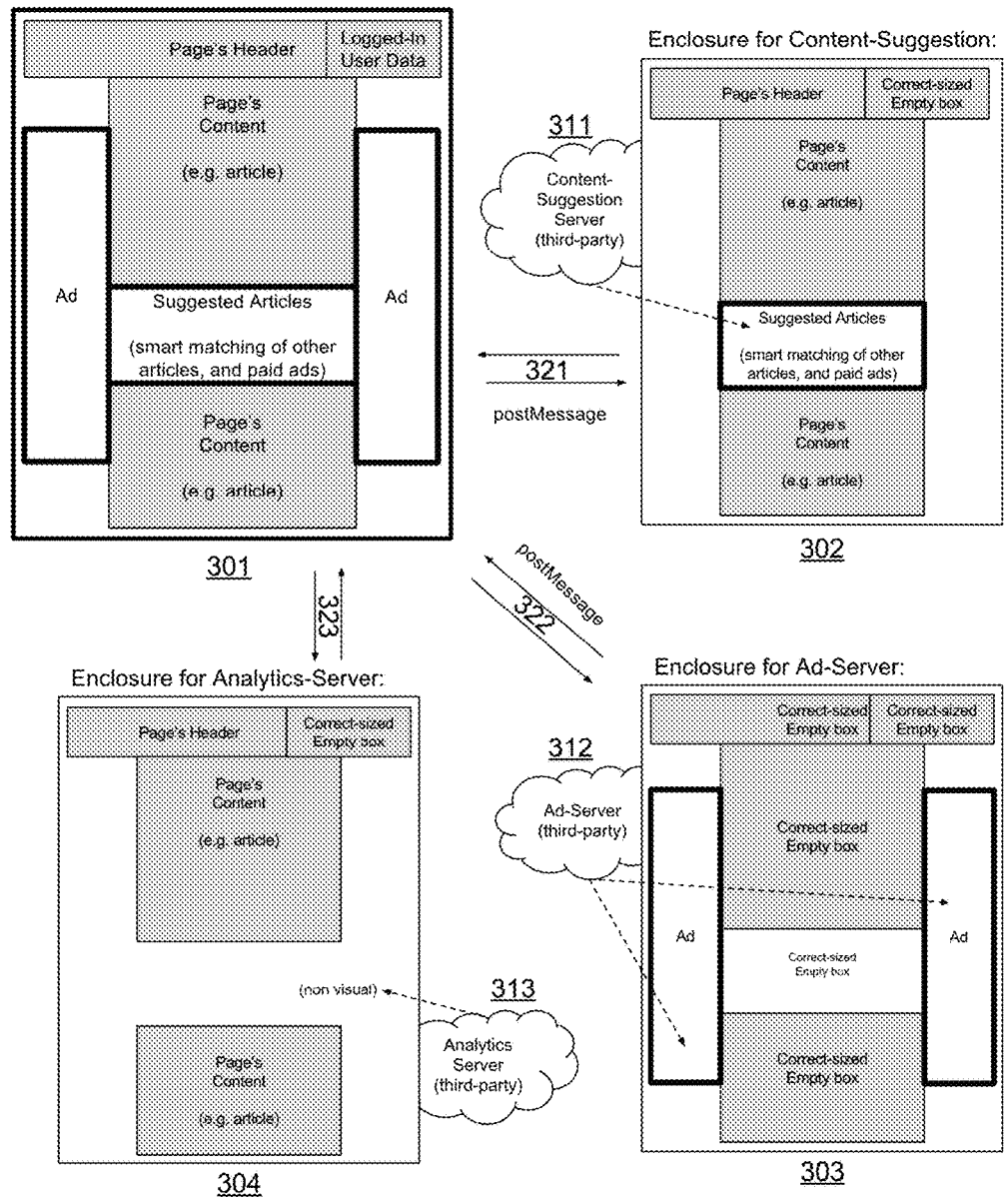
FIG. 3 is a schematic diagram of VICE Enclosures that encapsulate the third-parties.

FIG. 3 is a schematic diagram of VICE Enclosures that enclose the third-parties, for the same site that was exemplified in FIG. 2.

The site 301 is activating VICE, which opens three Enclosures (e.g. invisible iFrames) 302, 303, 304.

VICE reflects most of the site's own DOM (the gray regions in 301) to the Enclosures (302, 303, 304) using postMessage (321, 322, 323), but because the ad-server should NOT access the content of the site, only hollow empty boxes are reflected into its Enclosure 303. Note that the contents of one region ("Logged-In User Data") is not reflected to any enclosure, because the site's administrator thinks it contains sensitive data.

VICE activates the third-parties 311, 312, 313—each in its respective Enclosure 302, 303, 304. As the third-parties create DOM elements in their Enclosures, VICE reflects these back into the main page using postMessage (321, 322, 323).

Scenario: User-Click that Opens a Pop-Up

De-tour: Small explanation about pop-up blockers. Pretty much all modern browsers come with a built-in pop-up blocker. The pop-up blockers are configured by default to allow a pop-up only in response to a user-click. That is, if the user clicks, and a click-event-handler opens a pop-up, then the pop-up blocker will allow. However, if some Java-Script code tries to just open a pop-up "unprovoked", then the pop-up blocker will prevent it. Some browsers (such as Chrome and FireFox) will allow a pop-up if it is opened "quickly" after a user-click (about 100 milliseconds). Other browsers (such as Edge and IE) will only allow a pop-up if it is opened directly by the click-event-handler. Once the click-event-handler is done, no pop-ups are allowed.

Figure 4:
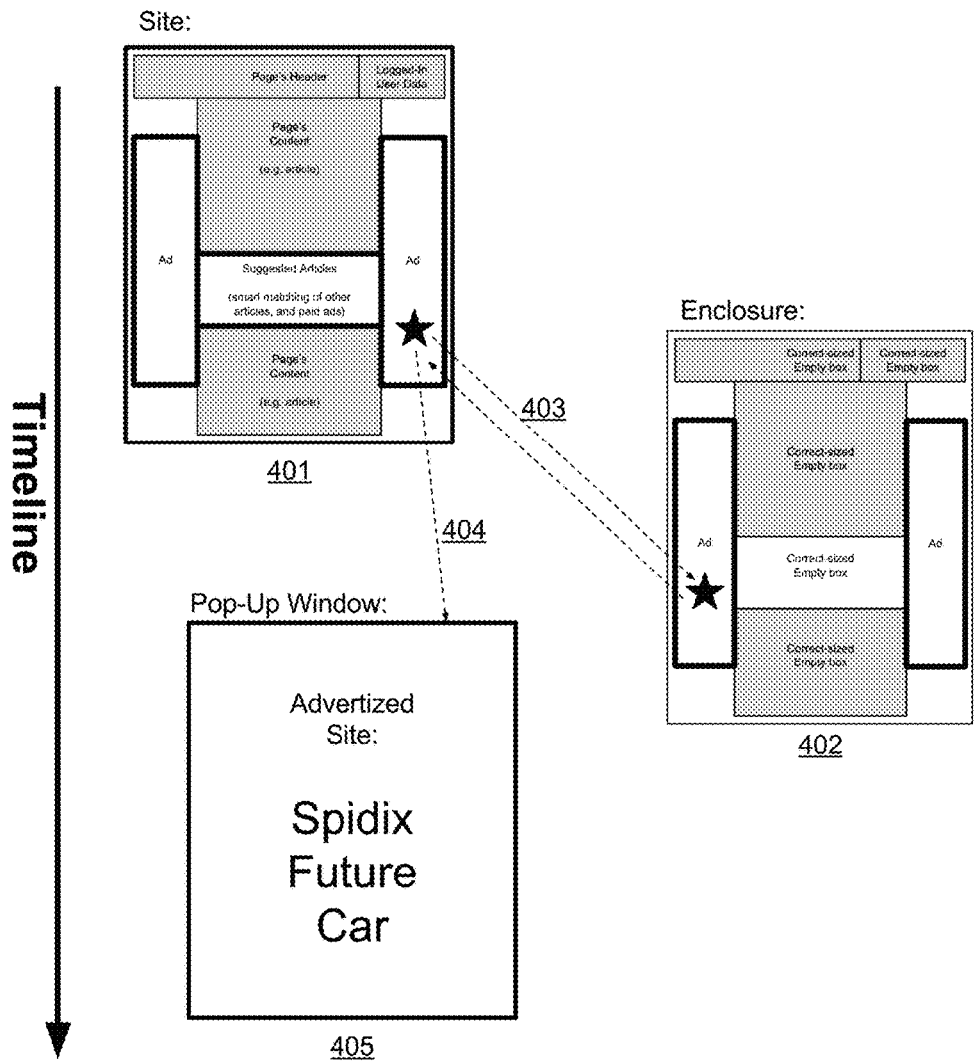
FIG. 4 is a schematic diagram of how a user's mouse-click is handled by VICE to open a pop-up window.

FIG. 4 is a schematic diagram of how a user's mouse-click is handled by VICE to open a pop-up window.

When the page was loading, some DOM elements that visualize an ad were created in the Enclosure 402 by the third-party. VICE then reflected these DOM elements back to the main page 401 via the Tunnel 403.

Now, the user clicks the ad (e.g. clicks on the reflected DOM elements). This causes VICE to reflect the click-event into the Enclosure 402 via the Tunnel 403.

In the Enclosure 402, the third-party's user-code tries to open a pop-up window. On Edge and IE, this will probably fail, as the Enclosure's click-event-handler is not called by a real user-click, but rather by the reflected click-event from the Tunnel 403 (note that even on Chrome and FireFox there is a good chance that the pop-up will be blocked, if the Tunnel doesn't reflect the click-event fast enough).

To overcome that, when the use clicks the ad, then besides reflecting the click-event to the Enclosure 402, VICE will also (and according to the site's administrator set policies), open an empty "preemptive pop-up window" 405.

If the user-code in the Enclosure tries to open a pop-up, then VICE "hijacks" it, and sends an appropriate message through the Tunnel 403 back to the main page. In the main page, VICE will then open the desired site in the already-opened "preemptive pop-up window" 405. Naturally, if the user-code in the Enclosure does not open a pop-up, then the "preemptive pop-up window" 405 is quickly closed, sadly with an annoying side-effect of a flickering pop-up.

User-Click that Navigates within the Site

Figure 5:
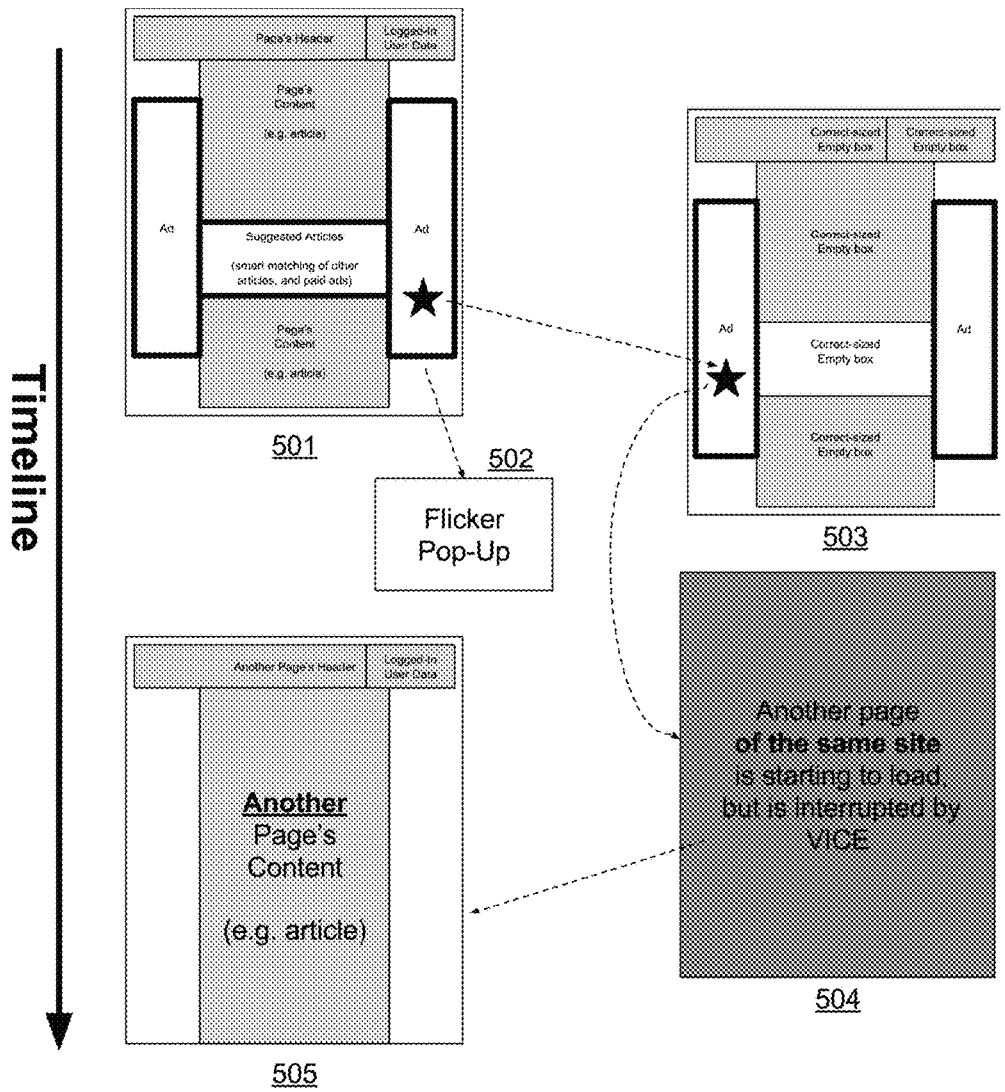
FIG. 5 is a schematic diagram of how a user's mouse-click is handled by VICE to navigate to another page in the same site.

FIG. 5 is similar to FIG. 4, only here the user-code tries to navigate to another page in the same site.

As in FIG. 4, the user clicks the ad in the main page 501. This may open a "preemptive pop-up window" 502 which will soon be closed. Also, VICE reflects the click-event into the Enclosure 503.

In the Enclosure 503, the third-party's user-code tries to navigate to another page in the same site, by performing:

window.location="http:// . . . "; or, window.location.replace("http:// . . . ").

Technically, these actions (and a few others) cannot be captured by VICE, as "window.location" is a non-writable property (e.g. VICE is not allowed to override the setter of "window.location").

Note: this is not a problem if the user-code is fetched using CORS and instrumented (described herein). However, not all third-parties provide CORS, so Instrumentation is not always possible.

So, the Enclosure's iFrame does navigate to another page in the same site (504).

When that other page is loading in the Enclosure, it is expected that it loads VICE in the very beginning of the page. VICE will promptly realize the situation (e.g. that this is an Enclosure) and will prevent the rest of the page from loading. Instead, VICE will send a proper message to the main page 501 via the Tunnel, causing VICE in the main page 501 to navigate to that other page in the same site (505).

User-Click that Navigates to Another Site

Figure 6:
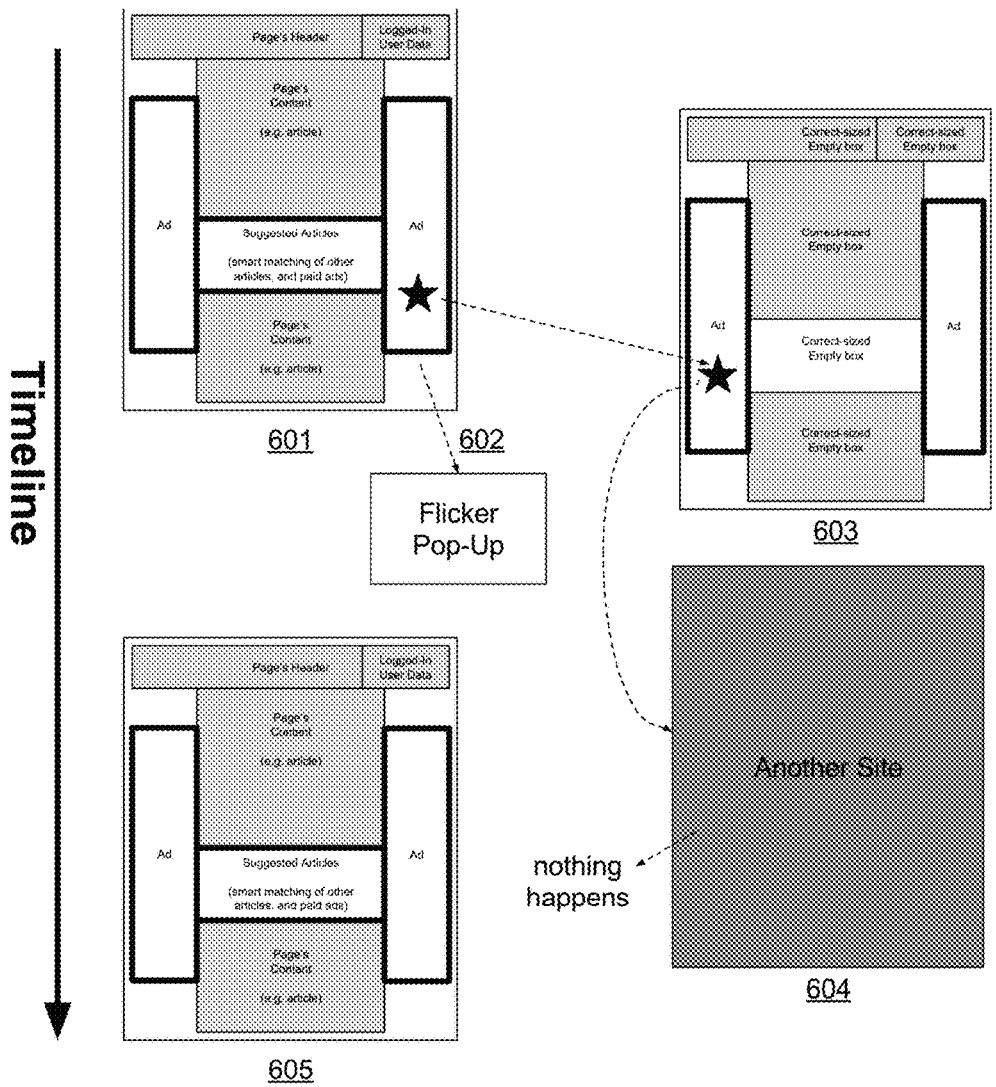
FIG. 6 is a schematic diagram of how a user's mouse-click is handled by VICE when the third-party tries to navigate to another site (which is ignored).

FIG. 6 is similar to FIG. 5, only here the user-code tries to navigate to another site.

As in FIG. 5, the user clicks the ad in the main page 601. This may open a "preemptive pop-up window" 602 which will soon be closed. Also, VICE reflects the click-event into the Enclosure 603. As in FIG. 5, the third-party's user-code tries to navigate to another site, so the Enclosure's iFrame does navigate to another site (604).

After a few seconds, when VICE realizes that the Enclosure is not responding to Tunnel messages, VICE will just close the Enclosure's iFrame 604.

Projecting the DOM

Figure 7:
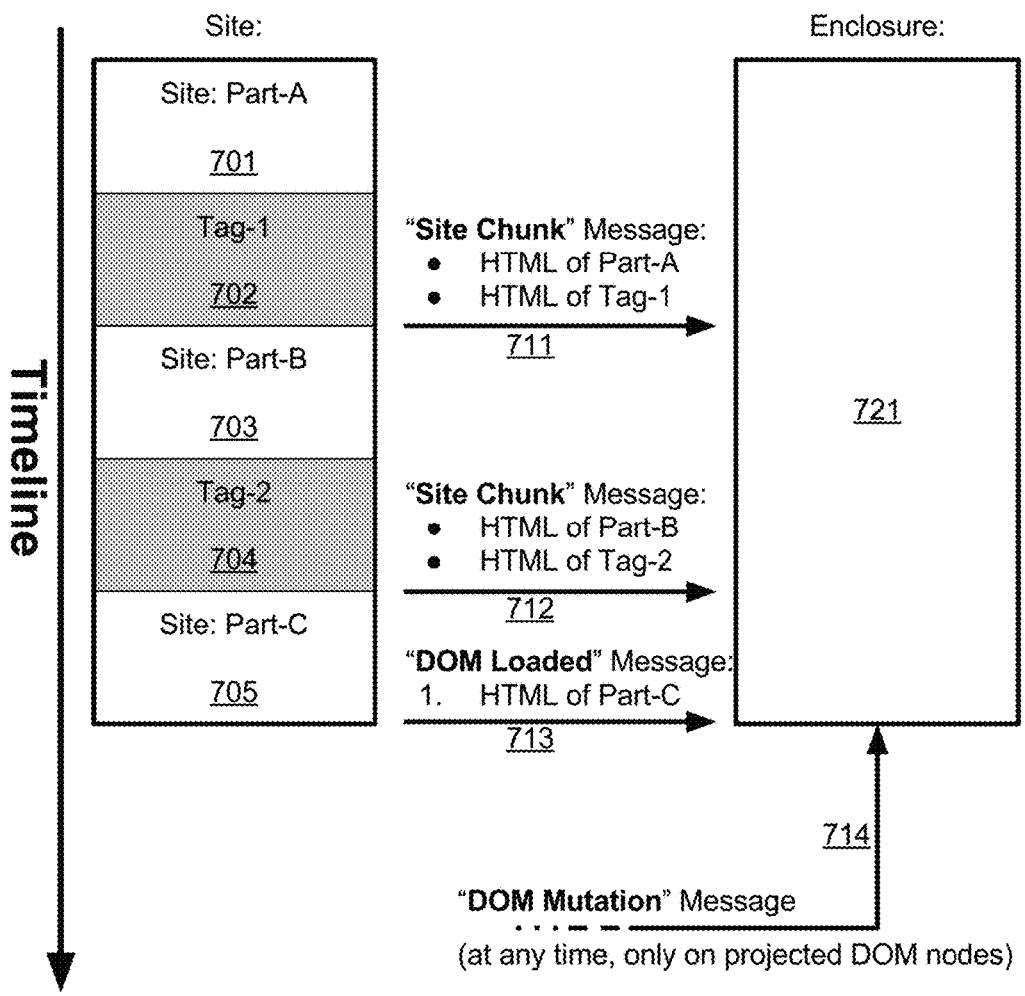
FIG. 7 is a schematic diagram that demonstrates how a site's DOM is reflected into the Enclosure.

FIG. 7 is a schematic diagram that demonstrates how a site's DOM is reflected into the Enclosure.

Most third-parties are represented in a page through a single "Tag", and some use several Tags. Tags may vary greatly, but for the sake of understanding, a classic tag may look something like this:

<script type="text/javascript">
      var page_category="Sports";
      var page_section="Football";
    </script>
    <script type="text/javascript" src="http:// . . . ">
    </script>

When the site wants VICE to execute the Tag securely inside a Closure, the Tag will have to be transformed in one way or another, to guarantee that the browser does not immediately execute it, and that VICE can reflect it into the Enclosure. There are many ways to do that, for example (added code underlined):

<script type="text/javascript"> vice.open( )</script>
    <script type="text/template">
      var page_category="Sports";
      var page_section="Football";

```
</script>
<script type="text/template" vice-src="http:// . . . ">
</script>
<script type="text/javascript"> vice.close( ); </script>
```
Using "text/template" instead of "text/javascript" prevents the execution of the script's content, and using "vice-src" instead of "src" prevents the ahead-of-time pre-loading of the URL.

On a page without VICE, when the browser executes the Tag's JavaScript, the HTML after the tag does not yet exist. If the third-party's JavaScript performs: document.write (" . . . some HTML . . . "), then the written HTML is inserted into the DOM right after the Tag. Only after the Tag's JavaScript (and any synchronous JavaScript that it produced by using "document.write" to create additional <script> tags) is done executing, will the page continue to load.

The site illustrated in FIG. 7 contains two VICE-transformed Tags 702, 704 of the same third-party which are embedded inside the HTML of the site itself 701, 703, 705.

The Enclosure's iFrame (721) is only created after the first Tag. At which point, VICE reflects the Tag and the HTML that precedes it into the Enclosure by sending a "Site Chunk" message 711 via the Tunnel. Another "Site Chunk" message 712 is performed after the second tag, and a final "DOM Loaded" message 713 is made when the main page's DOM is done loading.

While the "Site Chunk" and "DOM Loaded" messages can be thought of as "synchronous" (that is, are synchronic with the load of the site), VICE also performs a-synchronous reflections: VICE knows which DOM elements are already reflected, and when such an element is mutated (elements are inserted into it, its' attributes change, or the element is removed from DOM) a non-synchronous "DOM Mutation" message 714 via the Tunnel. Note that once the main page is fully loaded, every mutation on any element is always reflected via "DOM Mutation" message.

Site-Enclosure Communication

Figure 8:
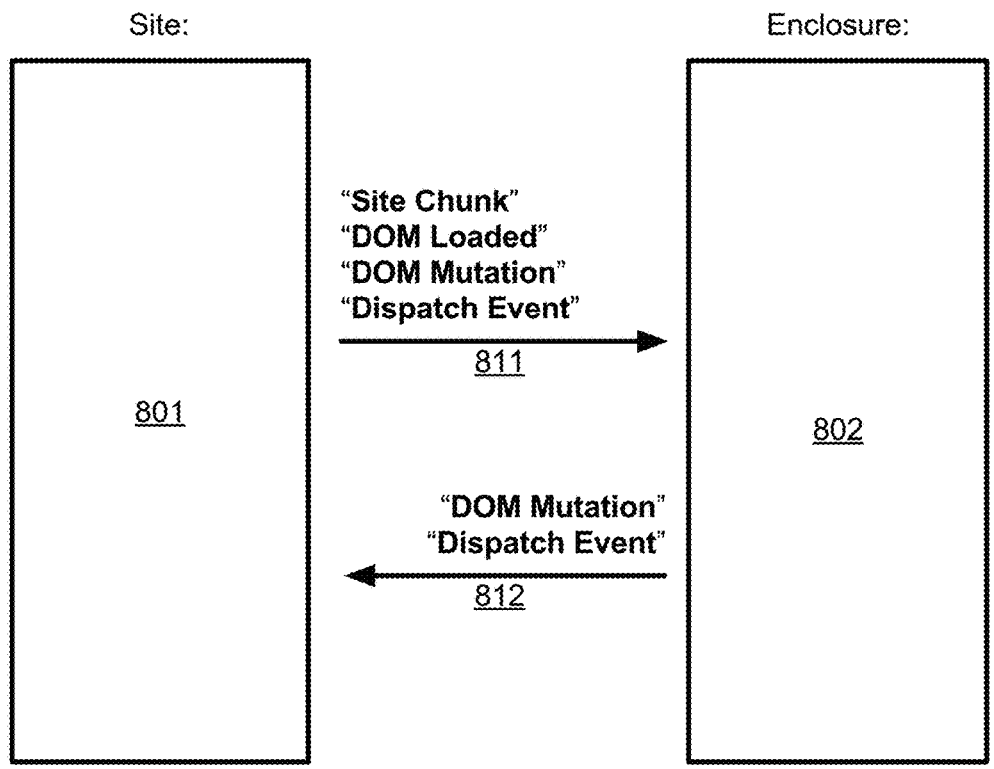
FIG. 8 is a schematic diagram of the messages that goes through the Tunnel between the main page and the Enclosure.

FIG. 8 is a schematic diagram of the messages that goes through the Tunnel between the main page and the Enclosure.

As shown in FIG. 7, The "Site Chunk" and "DOM Loaded" messages are sent from the main page 801 to the Enclosure 802. Also "DOM Mutation" messages are sent both ways 811, 812 for two-way reflection. Beside of reflecting the DOM, VICE also reflects Events—such as mouse-click, mouse-move, mouse-down, keyboard-press, keyboard-focus-change-event, etc. (events may be reflected both ways).

VICE may employ many more message-types.

Instrumenting JavaScript

As discussed supra (see "Instrumentation") VICE will manipulate the JavaScript that is executed by a third-party. The guide-lines for the instrumentation are: 1) minimal impact on performance; 2) never allow the user-code to have a reference to a Location instance (e.g. "window.location"); and, 3) never allow the user-code to assign into a Location instance (e.g. "window.location= . . . "). VICE will parse the to-be-executed third-party JavaScript, and will re-build it—but slightly altered.

The alterations are: "get property" expressions are wrapped inside viceGetProperty, for example:
```
var propertyName="prop";
alert(
object[propertyName]+
object.location);
```
Is instrumented as:
```
var propertyName="prop";
alert(
viceGetProperty(object, propertyName)+
viceGetProperty(object, "location"));
```
The function viceGetProperty receives an object and a property-name. If viceGetProperty realizes that the object is a Window (e.g. "window", "parent", iframe.contentWindow, etc.) and the property-name is "location", then viceGetProperty will not return the forbidden Location object, but rather an "imposter" object that will mediate potentially unsecured operations that the user-code will perform on the Location object.

Additionally, the "set property" expressions are wrapped inside viceSetProperty, for example:
```
var propertyName="prop";
object[propertyName]=url;
object.location=url;
```
Is instrumented as:
```
var propertyName="prop";
viceSetProperty(object, propertyName, url);
viceSetProperty(object, "location", url);
```
The function viceSetProperty receives an object, a property-name, and the value to assign into the property. If viceSetProperty realizes that the object is a Window and the property-name is "location", then viceSetProperty will carefully mediate this potentially unsecured operation: according to the policy set by the site's administrator, the operation may be ignored, or reflected to the main page, where VICE will navigate to another URL as the user-code requested.

Additionally, the "get global identifier" expressions are wrapped inside viceGetGlobal—only for global identifiers whose name is "location"—for example:
```
function func1( ){
    var location;
    alert(location); // ignored: "location" is local
}
function func2( ){
    alert(x); // ignored: not "location"
}
function func3( ){
    alert(location); // instrumented: "location" is global
}
```
Is instrumented as:
```
function func1( ){
    var location;
    alert(location); // ignored: "location" is local
}
function func2( ){
    alert(x); // ignored: not "location"
}
function func3( ){
    alert(viceGetGlobal("location"));
}
```
The function viceGetGlobal receives a global identifier name: this is effectively a property of a Window object. If viceGetGlobal realizes that the identifier's name is "location", then viceGetProperty will return an "imposter" object—just like viceGetProperty.

Additionally, the "set global identifier" expressions are wrapped inside viceSetGlobal—only for global identifiers whose name is "location"—for example:
```
function func1( ){
    var location;
    location=url; // ignored: "location" is local
}
function func2( ){
```

```
    x=url; // ignored: not "location"
}
function func3( ){
    location=url; // instrumented: "location" is global
}
```
Is instrumented as:
```
function func1( ){
    var location;
    location=url; // ignored: "location" is local
}
function func2( ){
    x=url; // ignored: not "location"
}
function func3( ){
    viceSetGlobal("location", url);
}
```
The function viceGetGlobal receives a global identifier name: this is effectively a property of a Window object, and the value to assign into the window's property. If viceSetGlobal realizes that the identifier's name is "location", then viceSetGlobal will behave just like viceSetProperty.

As noted above, the HTML standards that are defined by W3C states that "window.location" cannot be overridden, both when getting the property, and when assigning into it: the "location" property of a window is non-configurable. Most properties of the "window.location" object itself are also non-configurable.

The above description of the Instrumentation focused on the property "location", but there are some other object-properties that needs overriding:

The "window.top" and "window.parent" are non-configurable, but the Instrumentation can overcome that in the same manner as it did "window.location": this will make the third-party that executes inside the Enclosure to believe that it is "living" in the main page rather than in an IFrame. This could affect the behavior of some third-parties.

The "event.isTrusted" is non-configurable, but the Instrumentation can overcome that in the same manner as it did "window.location": this property is designed to allow JavaScript code to be sure that a DOM event is "authentic" (for example—a real user mouse-click), and not artificially dispatched by some JavaScript (for example, a call to "element.click( )"). However, because VICE reflects DOM events, these reflected DOM events in the Enclosure has isTrusted=false. Some third-parties would ignore DOM events with isTrusted=false—even though in the context of VICE, these synthetically reflected DOM events are actually reflecting authentic DOM events from the main page, and the third-party should indeed regard them as authentic.

There may be other properties that the Instrumentation would override.

Figure 9:
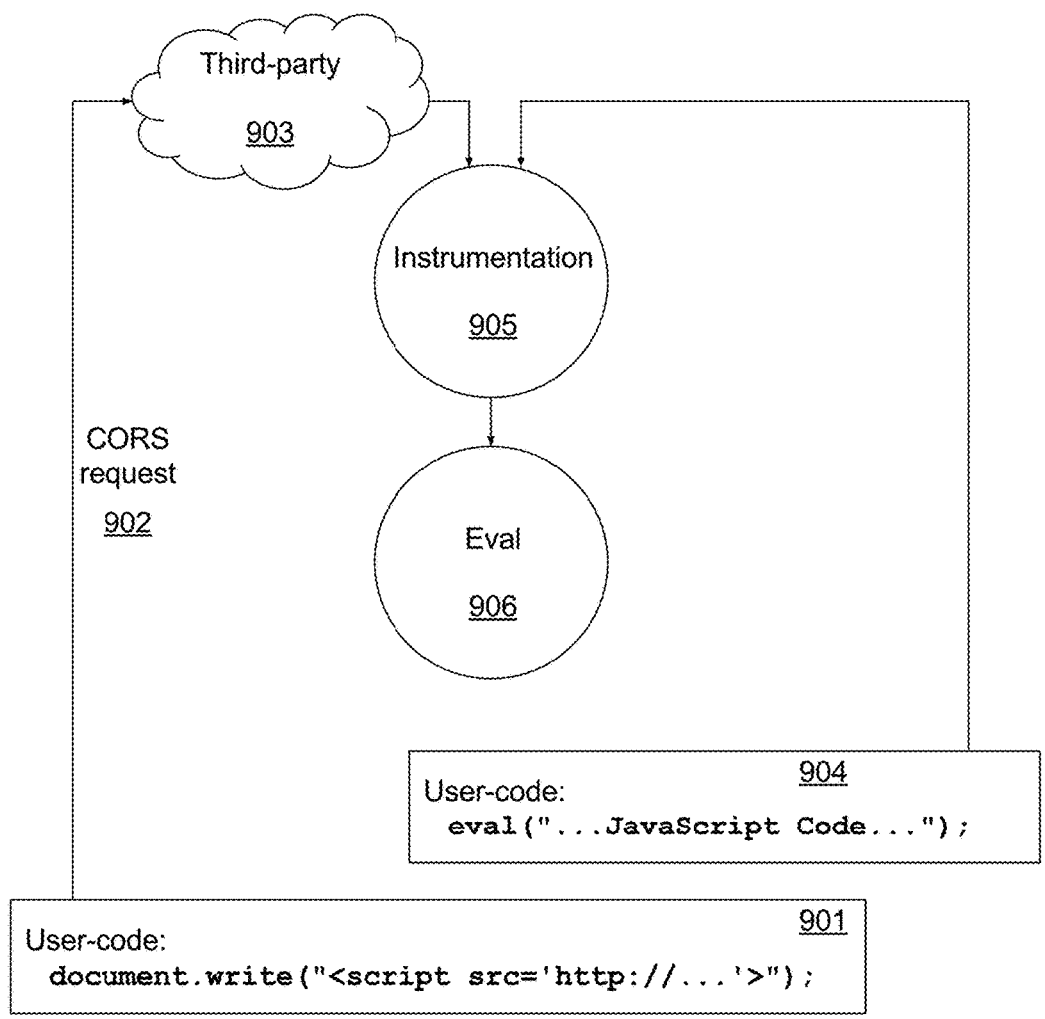
FIG. 9 is a schematic diagram that shows how Java-Script code is fetched from the third-party or generated dynamically, and how it is then instrumented and executed.

FIG. 9 is a schematic diagram that shows how Java-Script code is fetched from the third-party or generated dynamically, and how it is then instrumented and executed.

Box 901 shows how the user-code is asking the browser to load and execute a JavaScript URL. According to the policy, VICE may perform the HTTP request via XMLHttpRequest instead 902, so the JavaScript is retrieved from the third-party web-server 903 as text, without being automatically executed by the browser. VICE would then instrument the JavaScript 905, and execute the resulting instrumentation 906.

Alternatively, the user-code may generate JavaScript code dynamically 904 and try to execute it. Again, VICE would instrument the JavaScript 905, and execute the resulting instrumentation 906.

There are many ways that a JavaScript code can execute a dynamically-generated JavaScript code:
    eval(" . . . ")
    element. setAttribute("onclick", " . . . ")
    new Function(" . . . ")
    . . . and many more ways.
VICE will cover all of these ways, and will always make sure that a dynamically generated JavaScript code be instrumented before being executed.

CORS-Proxy

Figure 10:
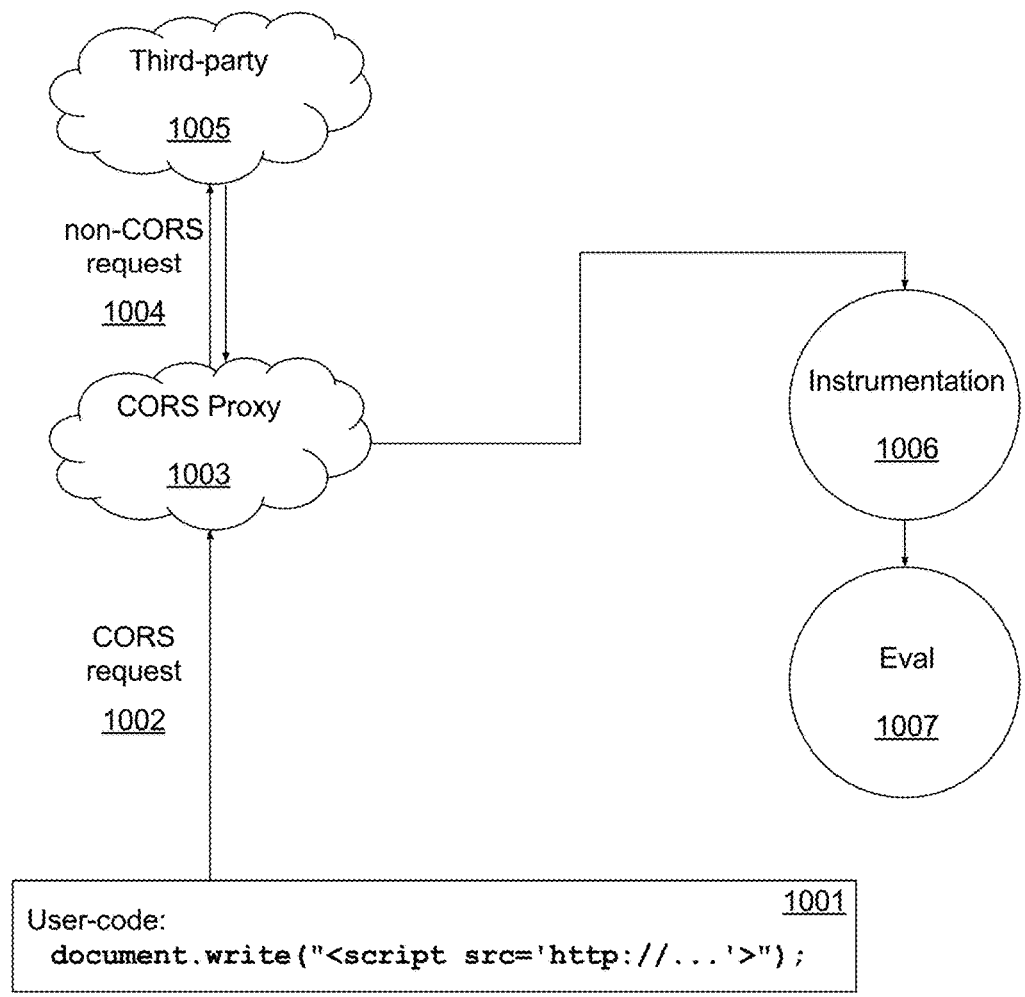
FIG. 10 is a schematic diagram that shows how Java-Script code is fetched from a third-party web-server that doesn't support CORS, through the mediation of the CORS-Proxy.

FIG. 10 is a schematic diagram that shows how Java-Script code is fetched from a third-party web-server that does not support CORS, through the mediation of the CORS-Proxy.

As described above, VICE may want to Instrument JavaScript that is loaded from an HTTP request—by performing: "document.write("<script src='http:// . . . '>");". VICE needs to perform the HTTP request and inspect the returned JavaScript as text. This is only allowed by the browser if the third-party web-server allows for it: if the third-party web-server sends back the "Access-Control-Allow-Origin" HTTP header.

When the third-party web-server does not send back the "Access-Control-Allow-Origin" HTTP header, VICE has three options: to prevent the execution of this JavaScript, or to allow it to execute un-instrumented (and with a risk of altering the behavior of the third-party, as described above). The third option is to use a CORS-Proxy.

FIG. 10, box 1001 shows how the user-code is asking the browser to load and execute a JavaScript URL. When the policy is to use the CORS-Proxy, VICE will perform an HTTP request via XMLHttpRequest 1002—not to the original third-party web-server 1005—but rather to VICE's CORS-Proxy 1003. When VICE's CORS-Proxy 1003 receive the request, it will perform a non-CORS request 1004 the original third-party web-server 1005. CORS-Proxy will then proceed to return the retrieved third-party JavaScript VICE—while adding the "Access-Control-Allow-Origin" HTTP header. This will allow VICE to inspect the returned JavaScript as text, to Instrument it 1006, and to execute the instrumented JavaScript 1007.

A major down-side of the CORS-Proxy is that the third-party's web-server would receive many HTTP requests from the same CORS-Proxy IP, and this may lead the third-party's web-server to mistakenly assume that this IP is a robot. This may result in the third-party not providing proper responses, and/or not counting these requests. Thus, an ad-server may show an advertiser that few ads are served, while in reality—many have.

Another down-side of the CORS-Proxy is that the third-party's web-server receives the HTTP requests from the CORS-Proxy's IP: this IP will resolve into an incorrect Geo-Location data (for example, if the browser is in England and the CORS-Proxy is in the USA, then the third-party's web-server will believe that the browser is in the USA).

An advantage of CORS-Proxy is that it allows VICE to "localize" third-party cookies. Example: a behavioral-tracking third-party whose DNS is "www.behave.com" is present in many web-sites. Whatever the user is doing in all of these sites is causing the user's browser to send a HTTP requests to "www.behave.com" with the same set of cookies. Thus, if the user viewed second-hand cars on one site, the user will suddenly be swamped by car ads. The clients of VICE are web sites. These sites are sometimes in favor of this, but they would like the behavioral-tracking third-party to pay them for the right to track users' behavior. VICE provides the site's administrator the tools to block these cookies, or to allow them if the third-party pays the site.

Policy-Center

When a third-party performs some significant or potentially risky activity, the Policy-Center is called upon to decide how VICE should mediate the activity. There are several Policy-types—each for a different type of third-party action. In general, there are usually three possible decisions that a Policy can take: Deny, Grant, or Alter. Some Policy-types are listed here:

Move Node in DOM:
  Creation of a Node (e.g. insertion into the DOM),
  Removal of a Node (e.g. remove from the DOM),
  Moving of a Node (e.g. remove and re-insert to the DOM).

VICE allows the site-administrator to define "regions" in the page, each having different "access mode" per Authority—for example:
  No-Access: nodes are not even reflected into the Enclosure,
  Read-Only: nodes are reflected from the main page to the Enclosure, but not back.
  Read-Write: nodes are reflected from the main page to the Enclosure and back.

The "Move Node in DOM" policy-decision will usually enforce the relevant Nodes' access-modes.

Read/Write Element Attribute:
  Modification of attributes of DOM Elements (including the "style" attribute). Here too—the policy-decision will usually enforce the relevant Nodes' access-modes. Note however, that some attributes (such as a password-field's value) can have stricter policy.

Listen to DOM Event:
  Via "addEventListener" or setting an event-handling attribute (such as "onclick"). Here too—the policy-decision will usually enforce the relevant Nodes' access-modes.

Dispatch DOM Event:
  Via "dispatchEvent" or "element.click". Here too—the policy-decision will usually enforce the relevant Nodes' access-modes.

Site-Cookies:
  Can the third-party read/write the site's cookies. This only include the site's own cookies—accessed via "document.cookie". Note that cookies that are passed along HTTP requests (cookies that belong to third-party domains) are decided upon by the "HTTP Request" Policy-type described herein.

Local-Storage:
  Can the third-party access "window.localStorage" and "window.sessionStorage".

Post Message:
  Is the user-code allowed to send messages to other windows—via "postMessage".

HTTP request:
  The user-code can initiate HTTP requests through various techniques:
    <img src=" . . . ">
    <div style="background:url( . . . )">
    <a href=" . . . ">
    <iframe src=" . . . ">
    <script src=" . . . ">
    <link rel="stylesheet" href=" . . . ">
    . . . and many more.

Besides the usual Deny/Grant/Alter decision, this Policy-type may also decide if cookies may be transported in the request (through the HTML5 attribute crossorigin="anonymous"). Also, the decision may be to perform the request via XMLHttpRequest so that the content may be manipulated before usage. Or by diverting the request to go through the CORS-Proxy.

Other Window Access:
  Will the user be aware of some other window (usually a window inside an iFrame), and will the user be aware of children-windows of that window.

Exemplifications of VICE Working with Other Non-JavaScript Code

HTML: when the third-party code is calling "document.write(someHtml)" or "element.innerHTML= someHtml" (or any other method), then VICE code parses the written HTML and carefully re-builds it—manipulating sensitive tags and attributes—seeking advices from the "Policy" system along the way.

CSS: Style-sheets can contain problematic definitions, for example invocation of HTTP requests. VICE code parses the CSS and possibly alters it.

WebAssembly: For example, all the calls that it makes to Java-Script functions must be safely wrapped.

CONCLUSION

The aforementioned flowcharts and diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Likewise, the terms "one or more" and "plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Although various features of the invention may be described in the context of a single embodiment, the features may also be provided separately or in any suitable combination. Conversely, although the invention may be described herein in the context of separate embodiments for clarity, the invention may also be implemented in a single embodiment. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an example embodiment," do not necessarily refer to the same embodiment.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

What is claimed is:

1. A computerized system for protecting an electronic computing device that is browsing a website from undesired actions of a third-party software that is included by the website, and without hindering the proper action of the third-party software, comprising:
   a. a Virtual iFrame Containment Enclosure (VICE) remote server comprising a processor and a memory device operably connected to one another, and a plurality of computer-executable instructions stored on said memory device and executed by said processor for building a third-party protection code comprising VICE computer code that instructs a browser to create a secured iframe, and to execute the third-party code in it, while reflecting the Document Object Model (DOM) elements and events between the main page and the iframe, by:
      i. loading the website by the browser of the end-user electronic computing device;
      ii. instructing the browser to load VICE JavaScript/WebAssembly code from a JavaScript library;
      iii. instructing the browser, by the VICE Java-Script/WebAssembly code, to create a secured iframe, and to override selected native methods in it;
      iv. instructing the browser, by the VICE Java-Script/WebAssembly code, to reflect (by means of inter-frame messaging) a selected part of the main-page's DOM into the iframe;
      v. instructing the browser, by the VICE Java-Script/WebAssembly code, to execute the third-party in the said iframe—either as-is, or:
      vi. alternatively instructing the browser, by the VICE Java-Script/WebAssembly code, to load a third-party user-code in a textual way via XMLHttpRequest and to instrument it before executing it to achieve a greater degree of control;
      vii. instructing the browser, by the VICE Java-Script/WebAssembly code, to continuously reflect a selected subset of all DOM elements modifications bidirectionally between the main page and the iframe;
      viii. instructing the browser, by the VICE Java-Script/WebAssembly code, to continuously reflect a selected subset of all triggered DOM events bidirectionally between the main page and the iframe;
      ix. instructing the browser, by the VICE Java-Script/WebAssembly code, by various ways to evade undesired actions by the third-party user-code;
   b. one or more website administrator electronic computing devices in communication with at least one end-user electronic computing device and the remote server, and over a network to access a VICE third-party protection code;
   c. one or more third-party servers configured for transmitting via a network and inserting a computer code into the browser on the end-user electronic computing device, wherein the code is able to perform actions that are undesirable to the website administrator;
   d. one or more end-user electronic computing devices comprising a processor, the browser, and a computer memory to utilize the VICE third-party protection code tailored for each website hosted by the website administrator electronic computing device to evade the undesirable actions made by the third-party computer code, wherein the third-party protection code comprises a policy center on how to proceed based on the type of the action in question and a policy-center decision comprises one or more of the following:
      i. a grant decision to proceed with the action unchanged; or,
      ii. a deny decision to cancel the action while evading negative effects on the third-party; or,
      iii. an alter decision, comprising altering the action in a way that the action can perform partially or in a different way while evading negative effects on the third-party; and,
   e. a wired or wireless network connection between (a)-(d).

2. The computerized system of claim 1, wherein the third-party protection code is executed on the end-user electronic computing device, or on the website administrator device, or on the VICE remote server, or on a VICE proxy server, or any combination thereof.

3. The computerized system of claim 2, wherein the VICE remoter server computer memory generates a VICE third-party protection code tailored for the website hosted by the website administrator device, and a database to record the protection code and the website permission setting.

4. The computerized system of claim 3, wherein the protection code is generated by the remote server according to the browser type of an end-user device and the website permission settings before being transmitted to the browser of the end-user electronic computing device.

5. The computerized system of claim 4, wherein the VICE remote server further comprises a computer memory to record and analyze incidents of third-party unwanted code detection, and a database to store incident reports and statistical computation reports.

6. The computerized system of claim 1, wherein the third-party protection code further comprises: an enclosure IFrame; a reflection; a DOM functionality overriding; an Instrumentation; an evasion; and a CORS-Proxy, computer code.

7. The computerized system of claim 6, wherein the policy-center decision regarding an HTTP request further comprises using CORS-Proxy URL.

8. A one or more non-transitory computer-readable storage medium having computer-executable instructions stored thereon which, when executed by one or more computers, cause the one or more computers to perform operations comprising: protecting a user electronic computing device that is browsing a website from some undesired actions of a third-party software that is included by the website, without hindering the proper action of the third-party software by causing the one or more computers to perform operations comprising building Instrumented-code from a third-party user-Code, by:
   a. loading the website by the browser of the end-user electronic computing device;
   b. instructing the browser to load VICE JavaScript/WebAssembly code from a JavaScript library;
   c. instructing the browser, by the VICE Java-Script/WebAssembly code, to create a secured iframe, and to override some native methods in it;
   d. instructing the browser, by the VICE Java-Script/WebAssembly code, to reflect (by means of inter-frame messaging) a selected part of the main-page's DOM Document Object Model (DOM) into the iframe;

e. instructing the browser, by the VICE Java-Script/WebAssembly code, to execute the third-party in the said iframe—either as-is, or:

f. alternatively instructing the browser, by the VICE Java-Script/WebAssembly code, to load a third-party user-code in a textual way via XMLHttpRequest and to instrument it before executing it to achieve a greater degree of control;

g. instructing the browser, by the VICE Java-Script/WebAssembly code, to continuously reflect a selected subset of all DOM elements modifications bidirectionally between the main page and the iframe;

h. instructing the browser, by the VICE Java-Script/WebAssembly code, to continuously reflect a selected subset of all triggered DOM events bidirectionally between the main page and the iframe;

i. instructing the browser, by the VICE Java-Script/WebAssembly code, by various ways to evade undesired actions by the third-party user-code; and j. consulting a policy-center on how to proceed based on the type of the action in question, wherein a policy-center decision comprises one or more of the following:
   i. a grant decision to proceed with the action unchanged; or,
   ii. a deny decision to cancel the action while evading negative effects on the third-party; or,
   iii. an alter decision, comprising altering the action in a way that the action can perform partially or in a different way while evading negative effects on the third-party.

9. The one or more non-transitory computer-readable storage medium of claim 8, wherein the altering or fetching decision further comprises using CORS-Proxy URL.

10. The one or more non-transitory computer-readable storage medium of claim 8, wherein the third-party protection code is executed on the end-user electronic computing device, or on the website administrator device, or on the VICE remote server, or on a VICE proxy server, or any combination thereof.

11. The one or more non-transitory computer-readable storage medium of claim 8, wherein the VICE remoter server computer memory generates a VICE third-party protection code tailored for the website hosted by the website administrator device, and a database to record the protection code and the website permission setting.

12. The one or more non-transitory computer-readable storage medium of claim 8, wherein the third-party protection code further comprises: an enclosure iFrame; a reflection; DOM functionality overriding; an Instrumentation; an evasion; and a CORS-Proxy, computer code.

13. The one or more non-transitory computer-readable storage medium of claim 8, wherein the policy-center decision regarding an HTTP request further comprises using CORS-Proxy URL.

14. A computerized method for protecting an electronic computing device that is browsing a website from undesired actions of a third-party software that is included by the website, without hindering the proper action of the third-party software, comprising:

a Virtual iFrame Containment Enclosure (VICE) remote server comprising a processor and a memory device operably connected to one another, and a plurality of computer-executable instructions stored on said memory device and executed by said processor for building a third-party protection code comprising VICE computer code that instructs a browser to create a secured iframe, and to execute the third-party code in it, while reflecting the Document Object Model (DOM) elements and events between the main page and the iframe, by:

i. loading the website by the browser of the end-user electronic computing device;

ii. instructing the browser to load VICE JavaScript/WebAssembly code from a JavaScript library;

iii. instructing the browser, by the VICE Java-Script/WebAssembly code, to create a secured iframe, and to override selected native methods in it;

iv. instructing the browser, by the VICE Java-Script/WebAssembly code, to reflect (by means of inter-frame messaging) a selected part of the main-page's DOM into the iframe;

v. instructing the browser, by the VICE Java-Script/WebAssembly code, to execute the third-party in the said iframe—either as-is, or:

vi. alternatively instructing the browser, by the VICE Java-Script/WebAssembly code, to load a third-party user-code in a textual way via XMLHttpRequest and to instrument it before executing it to achieve a greater degree of control;

vii. instructing the browser, by the VICE Java-Script/WebAssembly code, to continuously reflect a selected subset of all DOM elements modifications bidirectionally between the main page and the iframe;

viii. instructing the browser, by the VICE Java-Script/WebAssembly code, to continuously reflect a selected subset of all triggered DOM events bidirectionally between the main page and the iframe;

ix. instructing the browser, by the VICE Java-Script/WebAssembly code, by various ways to evade undesired actions by the third-party user-code; and, x. consulting a policy-center on how to proceed based on the type of the action in question wherein a policy-center decision comprises one or more of the following:
   i. a grant decision to proceed with the action unchanged; or,
   ii. a deny decision to cancel the action while evading negative effects on the third-party; or,
   iii. an alter decision, comprising altering the action in a way that the action can perform partially or in a different way while evading negative effects on the third-party.

15. The computerized method of claim 14, wherein the Altering or Fetching decision further comprises using CORS-Proxy URL.

16. The computerized method of claim 15, wherein the third-party protection code further comprises: an enclosure IFrame; a reflection; DOM functionality overriding; an Instrumentation; an evasion; and a CORS-Proxy, computer code.

* * * * *